United States Patent [19]

Elkins

[11] Patent Number: 5,553,975

[45] Date of Patent: Sep. 10, 1996

[54] METHOD OF INSTALLING UNDERGROUND PIPES FOR SEWER LINES

[76] Inventor: Michael L. Elkins, 12803 Julian Ave., Lakeside, Calif. 92040

[21] Appl. No.: 441,232

[22] Filed: May 15, 1995

[51] Int. Cl.$^6$ .............................. F16L 3/13; F16L 1/028
[52] U.S. Cl. ..................... 405/154; 405/172; 248/74.2; 248/74.4
[58] Field of Search .................... 405/154, 172; 248/49, 74.2, 74.4

[56] References Cited

U.S. PATENT DOCUMENTS

| | | | |
|---|---|---|---|
| 3,494,849 | 2/1970 | Hess | 405/172 X |
| 3,523,668 | 8/1970 | Logsdon | 248/59 |
| 3,559,910 | 2/1971 | Babb | 248/59 |
| 3,568,455 | 3/1971 | McLaughlin et al. | 405/154 |
| 4,389,034 | 6/1983 | Suttles | 405/172 X |
| 4,524,935 | 6/1985 | Rumble | 248/62 |
| 4,795,115 | 1/1989 | Breeden et al. | 248/59 |
| 4,802,646 | 2/1989 | Cattani | 248/74.2 X |
| 4,826,111 | 5/1989 | Ismert | 248/49 |
| 5,007,768 | 4/1991 | Waller | 405/172 X |
| 5,042,958 | 8/1991 | Stenersen | 405/154 |
| 5,193,769 | 3/1993 | Hofle | 248/59 |
| 5,251,857 | 10/1993 | Grice et al. | 248/74.2 X |

FOREIGN PATENT DOCUMENTS

| | | | |
|---|---|---|---|
| 628331 | 10/1961 | Canada | 405/172 |
| 937356 | 8/1948 | France | 248/74.4 |
| 1562272 | 4/1969 | France | 248/74.4 |

OTHER PUBLICATIONS

DeVries, French–English Science Dictionary, 2d Edition, New York, McGraw-Hill Book Co., 1951, p. 77. (copy in AU3506).
"Swivel Lock Pipe Hanger." (undated).

*Primary Examiner*—Stephen J. Novosad
*Attorney, Agent, or Firm*—Milton S. Gerstein

[57] ABSTRACT

A method of installing sewer pipes for a new sewer line for achieving proper gradient, utilizes a plurality of two-piece pipe bracket-mounts. Typically, each length of sewer pipe is supported by two such bracket-mounts. Each two-piece bracket-mount consists of a lower, or bottom, semicircular half-section having a downwardly-projecting sleeve with a through-opening therethrough. The through-opening allows for the passage of an elongated, pointed-tip spike, which spike is driven into the bottom of the ditch by a hammer, or the like, to an amount that will achieve the proper gradient for the pipe to be associated therewith. After all of the spike have been driven in, the pipes are then laid on the lower semicircular half-sections and snapped in place therein. Then, the installer attaches the upper semicircular half-sections to the bottom semicircular half-sections. The two semicircular half-sections have cooperating clamping sections that allow the upper semicircular half-section to be slid down and onto the lower semicircular half-section and clamped together.

18 Claims, 6 Drawing Sheets

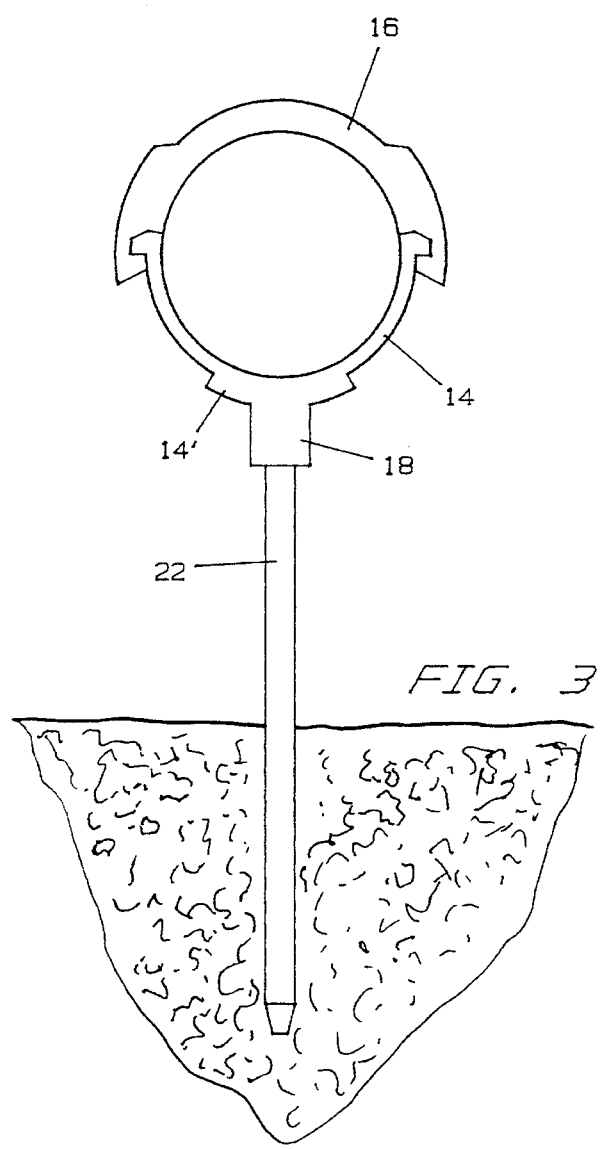
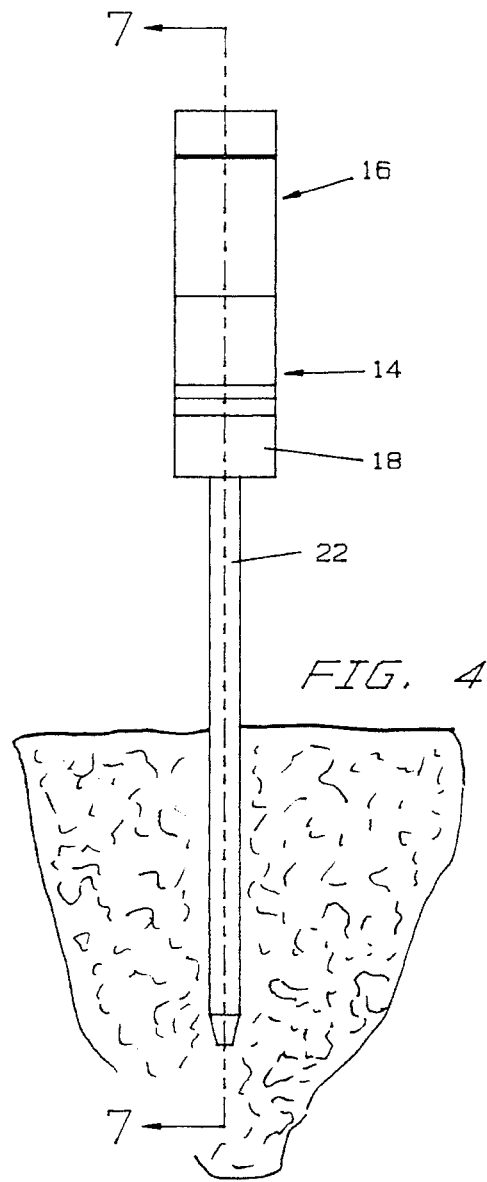
FIG. 3
FIG. 4
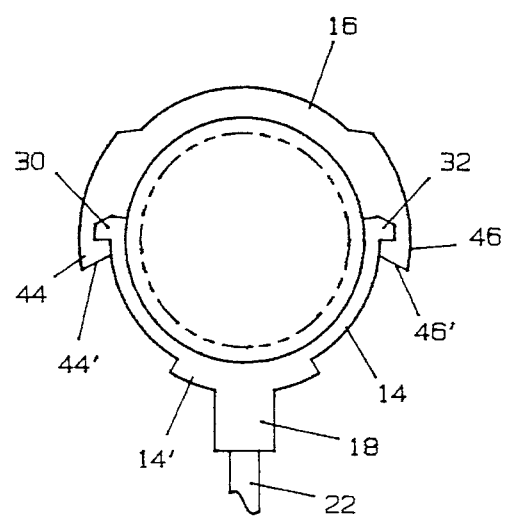
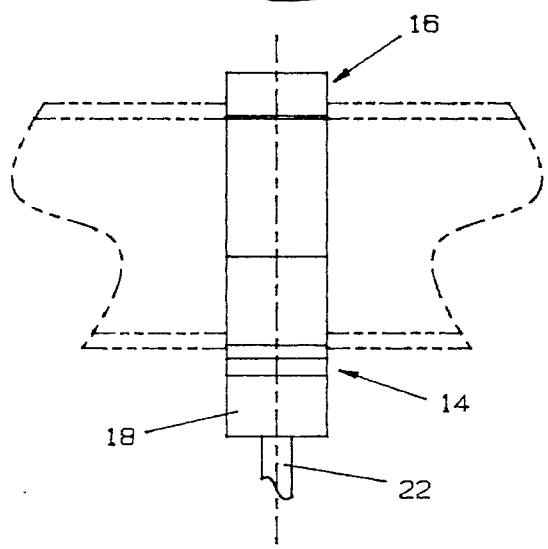
FIG. 5
FIG. 6

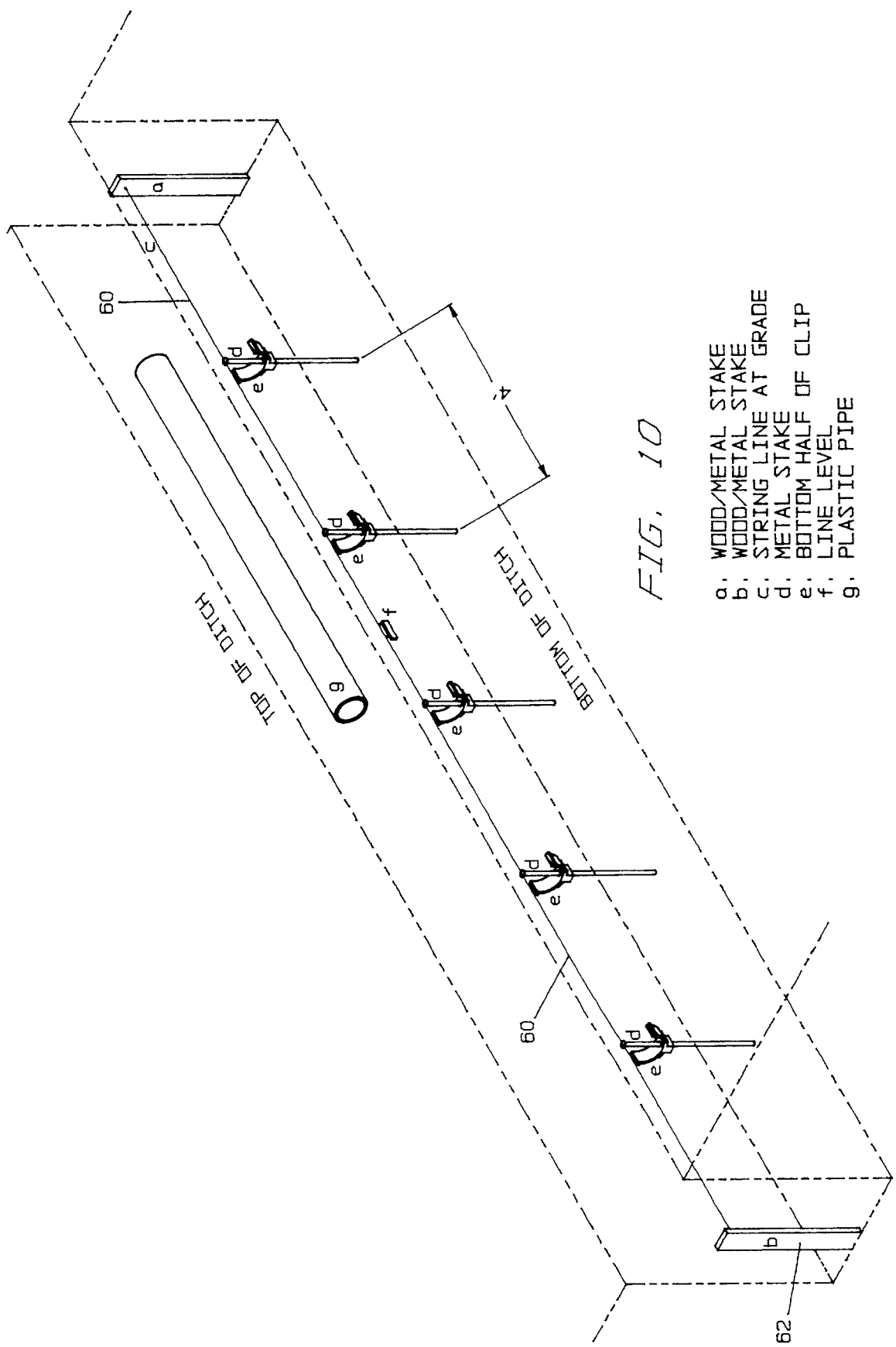

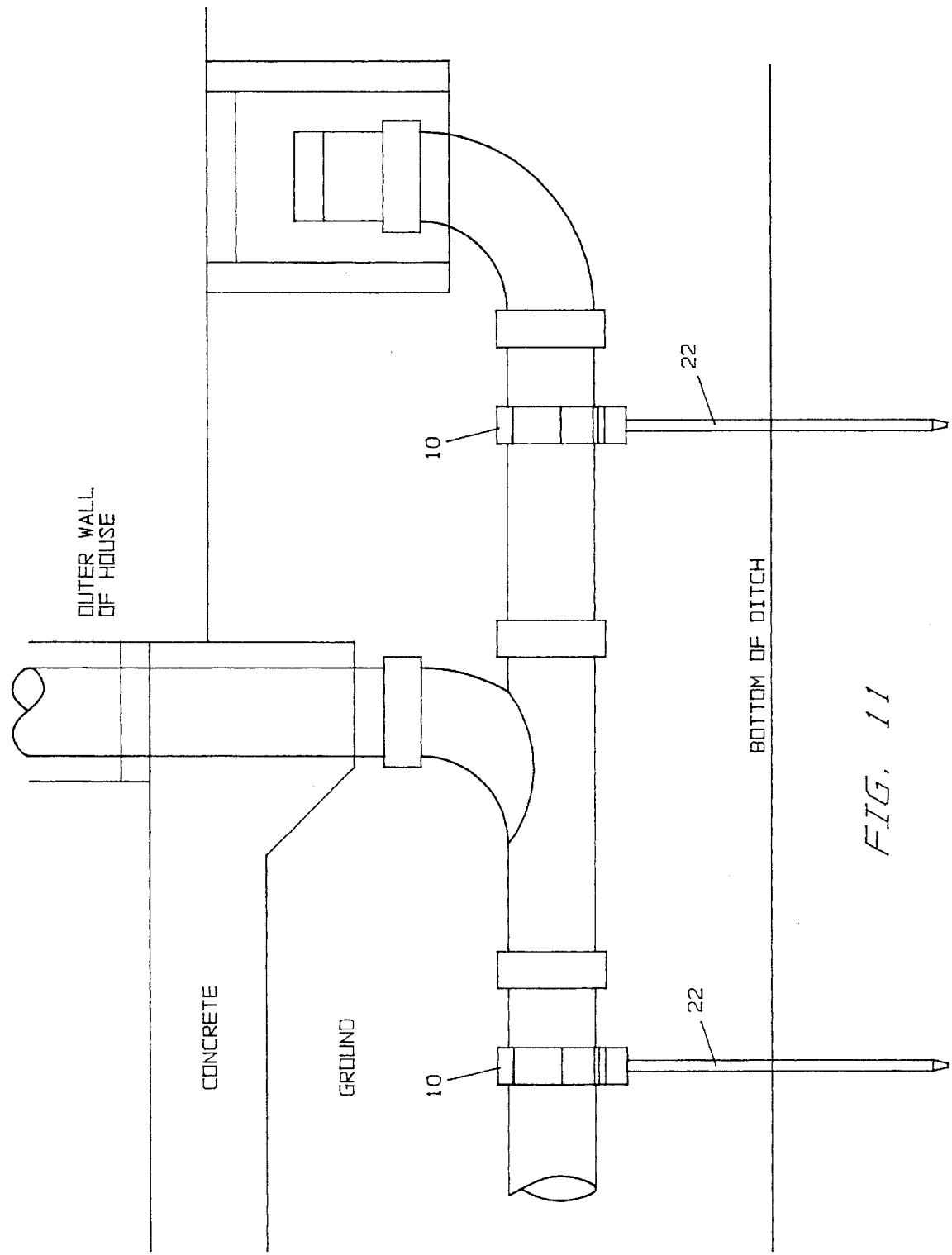

5,553,975

METHOD OF INSTALLING UNDERGROUND PIPES FOR SEWER LINES

BACKGROUND OF THE INVENTION

The present invention is directed to a method of laying sewer pipes for a new sewer line associated with a new construction, such as a house, apartment house, office building, and other structures. Currently, when installing a new sewer line for a new construction, a ditch is first dug that may have a length of between 30 and 100 feet and a depth initially starting at 18 inches and then increasing in depth along the length of ditch, in order to connect the new sewer line to the main sewer line, and in order to achieve a gradient of either ⅛ in. or ¼ inch per foot, depending upon the size of the sewer pipes being installed, in order for gravity flow of effluent. For sewer pipes having a diameter of 1½, 2 or 3 inch diameter pipes, the gradient according to local code is typically ⅛ inch per foot, while for sewer pipes having a diameter of 4 inches the gradient is typically ¼ inch per foot. The length of each pipe may vary. Typically, for metal pipe, each pip-length is 10 feet, while for ABS pipe, the pipe-length is 20 feet. After the ditch has been dug according to the above-description, the sewer pipes are laid down in the ditch using the process called shading, during which dirt that had been dug out, or sometimes new dirt, is placed under the newly-laid pipes in such a manner so as to achieve a gradient of ⅛ inch or ¼ inch per foot, and, thereafter, the ditch is filled with dirt until a level of approximately half of the height of the pipes has been reached, at which point the new sewer line is ready for inspection by an inspector, who inspects the sewer line to see if the gradient has met code. This process of shading is a very difficult, time-consuming, and frustrating job. Firstly, the very task of placing the dirt back into the bottom of the ditch is done manually, and, therefore, a burdensome job. Secondly, it is difficult to obtain the proper gradient for each pipe laid. In order to obtain the proper gradient, the dirt that has been packed under the pipe must usually be re-arranged in order obtain the proper gradient of ⅛ or ¼ inch per foot. To achieve the proper gradient, one must first add dirt under the length of the pipe, and then test for the proper gradient using a special level tool. For each pipe laid, there are multiple fillings and removal of dirt under the length of the pipe in order to obtain the required gradient. Thirdly, even after each pipe has been finally oriented and set to the proper degree, that proper setting is usually upset and destroyed upon the attachment of the end of the next pipe to an end of the thus-installed pipe, or upon the coupling of the just-installed pipe by means of a coupler to a house fixture, such as sink, bathtub, toilet, and the like. This act of coupling inevitably disturbs the previous-obtained gradient for that pipe, necessitating the re-doing of the shading process for that pipe. After all of the shading process has been done, with all of the pipes laid with proper gradient, and after inspection, the ditch is backfilled with a backhoe, until the ditch is completely filled with dirt.

Another problem that is common with the laying of sewer pipes for a new sewer line is that the pipes may have a bow in them, which will negate the shading process described above. If a pipe is bent or bowed, laying it on the bottom of the ditch and placing dirt under it during shading in order achieve the required gradient, will defeat the very act of achieving the proper gradient at the part of the pipe where the curve or bow is. Thus, the new line will fail inspection. To correct this problem of bows in the pipes, the pipes must be buttressed or reinforced at the point of curve or bow in order to attempt to straighten out the pipe, which is a very difficult and time-consuming task, and which often fails.

According to the present invention, the above-described process of achieving proper gradient is made much easier, and in a considerably shorter period of time, with much less effort and toil.

SUMMARY OF THE INVENTION

It is, therefore, the primary objective of the present invention to provide a method of installing sewer pipes that allow for the achievement of proper gradient in a much easier and faster manner as compared with conventional methods.

It is another objective of the invention to provide a method of installing sewer pipes in a sewer line that inherently corrects the bowing of plastic pipes, so that each pipe is straight after having been laid down.

Toward these and other ends, the method of installing sewer pipes for a new sewer line utilizes a plurality of two-piece pipe bracket-mounts. Typically, each length of sewer pipe is supported by two such bracket-mounts spaced four feet apart. Each two-piece bracket-mount consists of a lower, or bottom, semicircular half-section having a downwardly-projecting sleeve with a through-opening therethrough. The through-opening allows for the passage of an elongated, pointed-tip spike, which spike is driven into the bottom of the ditch by a hammer, or the like, to an amount that will achieve the proper gradient for the pipe to be associated therewith. After the spike has been driven in, an end-section, or other section, of the pipe to be laid is snapped into the interior of the semicircular half-section, and retained therein. After all of the lower semicircular half-sections for all of the pipes have been laid by means of their respective spikes, then the upper semicircular half-sections are snapped in place to the lower semicircular half-sections. The two semicircular half-sections of each bracket have cooperating clamping sections that allow the upper semicircular half-section to be slid down and onto the lower semicircular half-section and clamped together. This clamping attachment of the upper and lower semicircular half-sections causes the two semicircular half-sections to completely surround and retain the section of the pipe. In addition, since the two semicircular half-sections together make a perfect circular opening in which the pipe-section is held and clamped, and since the bracket-mounts firmly support the pipes from the ground, any bowing of the pipes is corrected. If at any time, the previously-laid pipes drop off from gradient, then the installer merely removes the respective, upper semicircular half-section, and pounds the stake again into the ground a requisite amount, or, if necessary, and without removing the upper semicircular half-section, lifts up the lower semicircular half-section to thereby raise the spike.

BRIEF DESCRIPTION OF THE DRAWINGS

The invention will be more readily understood with reference to the accompanying drawing, wherein:

FIG. 3 is a front elevational view of the two-piece bracket-mount used in the method of the invention, after the spike thereof has been driven into the ground at the bottom of a ditch for laying the sewer pipes;

FIG. 4 is a side elevational view of the two-piece bracket-mount used in the method of the invention, after the spike thereof has been driven into the ground at the bottom of a ditch for laying the sewer pipes;

FIG. 5 is a front detail view of the two-piece bracket-mount;

FIG. 6 is a side detail view thereof;

FIG. 10 is a plan view showing the manner of installing a new sewer piping system according to the invention; and FIG. 11 is a side elevational view showing the completely installed sewer piping system.

DETAILED DESCRIPTION OF THE INVENTION

Figure 1:
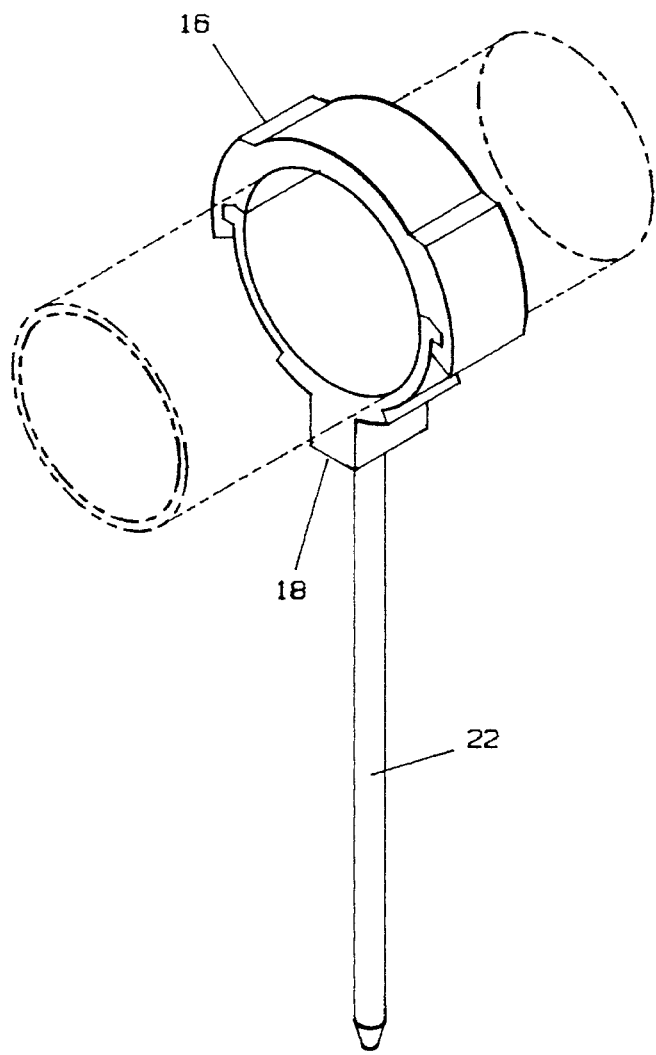
FIG. 1 is an isometric view of the bottom half of a two-piece bracket-mount used for installing sewer pipes according to the method of the invention showing how the bracket-mount is used.
Figure 2:
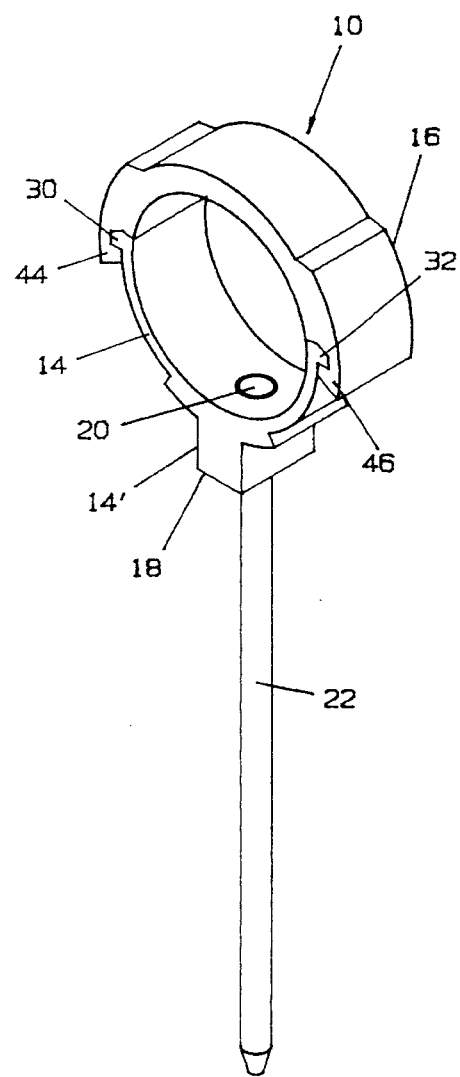
FIG. 2 is an isometric view of the two-piece bracket-mount used in installing sewer pipes according to the method of the invention.
Figure 7:
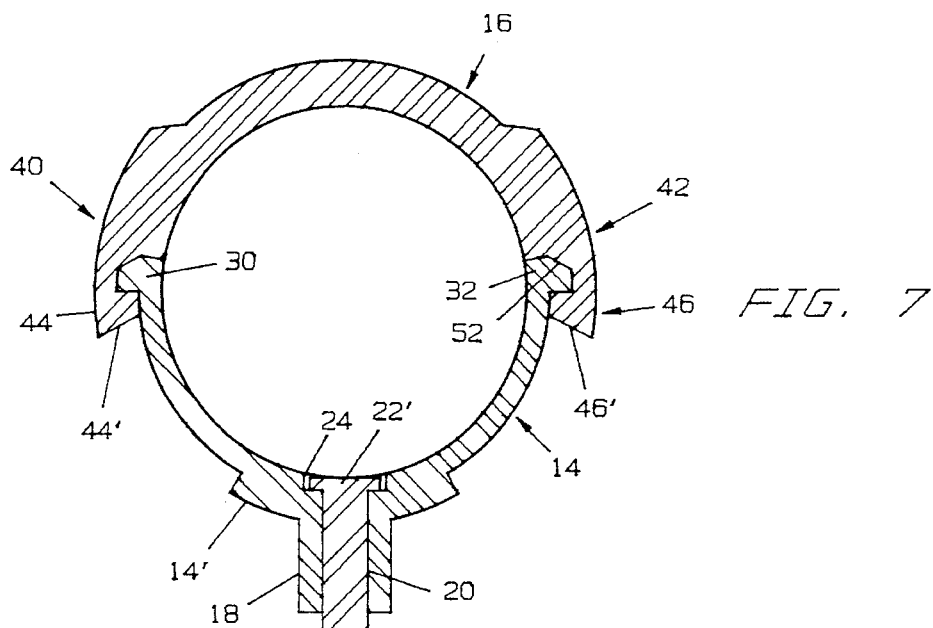
FIG. 7 is a cross-sectional view taken along line 7—7 of FIG. 7.
Figure 8:
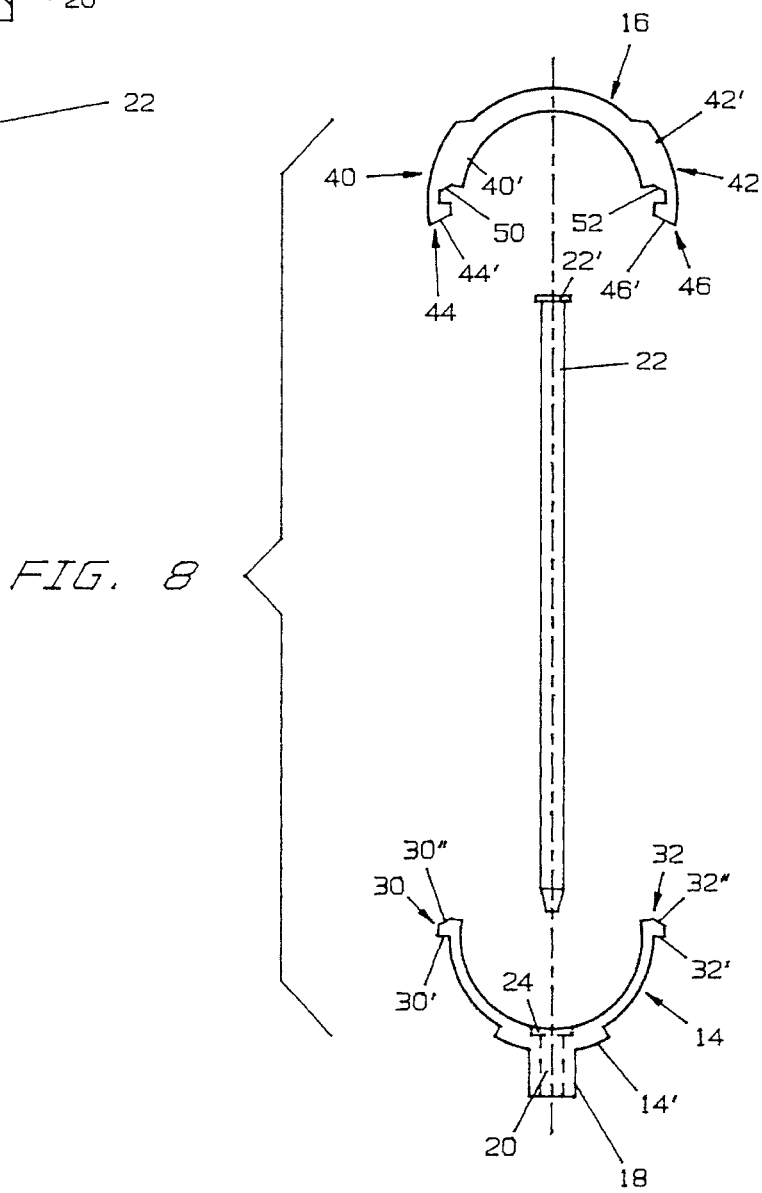
FIG. 8 is an assembly view showing how the two-piece bracket-mount and associated spike are assembled in use.

Referring now to the drawings in greater detail, there is shown a two-piece bracket-mount or bracket 10 by which the method of the invention is carried out. The two-piece bracket-mount or bracket 10 is made up of two, removably-mountable, clamped half-sections—a lower semicircular half-section 14, and an upper semicircular half-section 16. The bracket-mount or bracket 10 is preferably made of thermoplastic resin material that may be injected molded, and will have an inner diameter depending upon the size of the diameter of the pipes being received therein. Thus, there are preferably four different sizes of bracket-mounts 10 that will be used in new sewer-line construction for corresponding to 1½, 2, 3, and 4 inch-diameter pipes. The lower, semicircular half-section 14 has an interior surface and an exterior surface. On the exterior surface, there is a reinforced bottom area 14' from which projects a sleeve 18. A through-opening or hole 20, best seen in FIGS. 7 and 8, passes through the interior and exterior surfaces of the lower semi-circular half-section 14, through the center of the reinforced bottom area 14', and through the length of the sleeve 18. This reinforced through-hole is used for passing a steel spike 22, which spike 22 has an enlarged head 22' received in an enlarged countersunk hole 24 (see FIG. 7) formed in the interior surface of the lower, semicircular half-section 14, which countersunk hole is colinear with the through-opening 20 and forms the entrance thereto. The length of the steel spike 22 is preferably 12 or 18 inches, while the diameter of the hole 20 is ½ inch. The steel spike is driven or hammered into the ground at the bottom of the ditch, as seen in FIGS. 3 and 4, after having been passed through the through-hole 20, as described hereinbelow in greater detail. The semicircular half-section 14 is also provided with a pair of diametrically-opposed latch-members 30, 32, which latch-members constitute the upper, extreme ends of the lower semicircular half-section 14. Each latch-member 30, 32 has a lower, or bottom, horizontal latching surface 30', 32', respectively, and a sloping, or canted, lateral side surface 30", 32", respectively. The latch-members 30, 32 are used for latching or clamping the upper semicircular half-section 16, after a pipe has been snapped into the lower semicircular half-section 14, as described hereinbelow in greater detail.

The upper, semicircular half-section 16 has an exterior surface and interior surface, and a pair of cooperating latching members 40, 42 which constitute the lower, extreme ends of the upper semicircular half-section 16. Each cooperating latching member consists of a main, thickened section 40', 42', respectively, to provide strength, and a latching prong 44, 46. Each latching prong 44, 46 has a sloped, or canted, lateral side surface 44', 46', respectively, which slope at the same angle as the canted surfaces 30", 32", and are preferably 45 degrees. Formed in each of the interior surfaces of the latching members 40, 42 is a cutout 50, 52, respectively, which cutout has the same general shape as a latch-member 30, 32, whereby a latch-member 30, 32 will be received snugly in a cutout 50, 52, respectively. The upper semicircular half-section 16 is clamped to the lower semicircular half-section 14 by sliding the upper semicircular half-section 16 downwardly against the lower semicircular half-section 14, in the manner indicated in FIG. 7, such that the canted surfaces 44', 46' of the latching members 40, 42 slide against the canted surfaces 30", 32", respectively. Continued downward pushing of the upper semicircular half-section 16 against the lower semicircular half-section 14 causes the latching members 40, 42 to be pushed apart by the matching, contacting canted surfaces, until finally the prongs 44, 46 clear the horizontal latching surfaces 30', 32', whereupon the latch-members 30, 32 are received in the cutouts 50, 52, respectively, at which point, the latching prongs 44, 46 are latched against the horizontal latching surfaces 30', 32', to thereby clamp the upper and lower semicircular half-sections together.

The bracket-mounts 10 are used in the following manner, with reference being had to FIGS. 10 and 11. After calculating the different depths needed for the main line and all of the branch lines for the sewer, the ditch may then be dug. The mounting brackets 10 of the invention will take the place of the little mounds of dirt normally used to support the pipe according to conventional methods. After the ditch has been dug, two wooden, or metal, poles 60, 62 are inserted at the bottom center of the ditch, one at each end of the ditch. Next, the installer calculates the depth of the last fixture and/or end of the line "clean out", for the invert elevation of the pipe-run. Wooden pole 60 shown in FIG. 10 is on the house-side of the pipe-run, while wooden stake 62 is on the street-side, or sewer hook up. All the branch lines will dump into the main line. By tying an end of a string-line 64, which serves as a reference gradient-line, on stake 60, and the other end of the string-line to pole 62, the string-line will have a slope corresponding to the required gradient. The string-line is placed low enough in the ditch in order to receive all branch lines. After the string-line 60 has been set up, the first spike 22 is first inserted through the through-hole 20 of a first lower semicircular half-section 14 closest to the pole 72, in the manner depicted in FIGS. 10 and 11. The installer then bangs or hammers the spike into the ground of-the bottom of the ditch to a level at which the upper surface of the upper, enlarged head of the spike 22 is under and in contact with the grade-line string 60. Thereafter, the rest of the spikes 22, after having been inserted through respective lower semicircular half-sections 14 of the other brackets 10, are installed in the same way, with each spike being spaced about four feet from another. Each lower semicircular half-section is, thus, staked into the ground by means of its associated stake 22, which stake is driven into the ground an amount such that the upper surface of the upper, enlarged head of each spike 22 is under and in contact with the grade-line string 60. After all of the lower semicircular half-sections have been emplaced, the installer then returns to the first bracket 10 closest to the pole 62, and begins snapping the pipe sections into the lower semicircular half-sections 14, until all of the pipes have been snapped in place in the lower semicircular half-sections of all of the brackets 10. Since each lower semicircular half-section snap-fits a respective pipe section, after such snapping in place of the pipe section, the lower semicircular half-section with snapped-in pipe section is self-standing, and does not require any further support by the installer. This is very advantageous, since it allows the installer to the proceed to the next lower semicircular half-section, and snap in the next portion of a pipe, with the previous lower semicircular half-section serving to hold up the other, previous end for him. Thus, where in the prior-art method, two persons were required to install the pipe sections—where one was required to hold up one end of a pipe while the other held the other in order to maneuver the pipe into a position having proper gradient—in the present invention, only one person is required. After all of the pipes have been snapped into place into all of the lower semicircular half-sections, then the installer snaps in place all of the upper, semicircular half-sections 16, by forcing the latching members 40, 42 to expand laterally outwardly, until they clear the latch-members 30, 32, at which point the latching prongs 44, 46 are latched against the horizontal latching surfaces 30', 32', respectively, whereby each pipe portion is completely clamped by a two-piece bracket-mount 10. If the stake had been driven in too far, then the installer simply pulls up on an end of the pipe section. In the event of the pipe coming out of the clip, while in the process of gluing a fitting onto the pipe, it is a simple matter to go back down the line and snap the pipe back in, without a loss in the grade.

Figure 9:
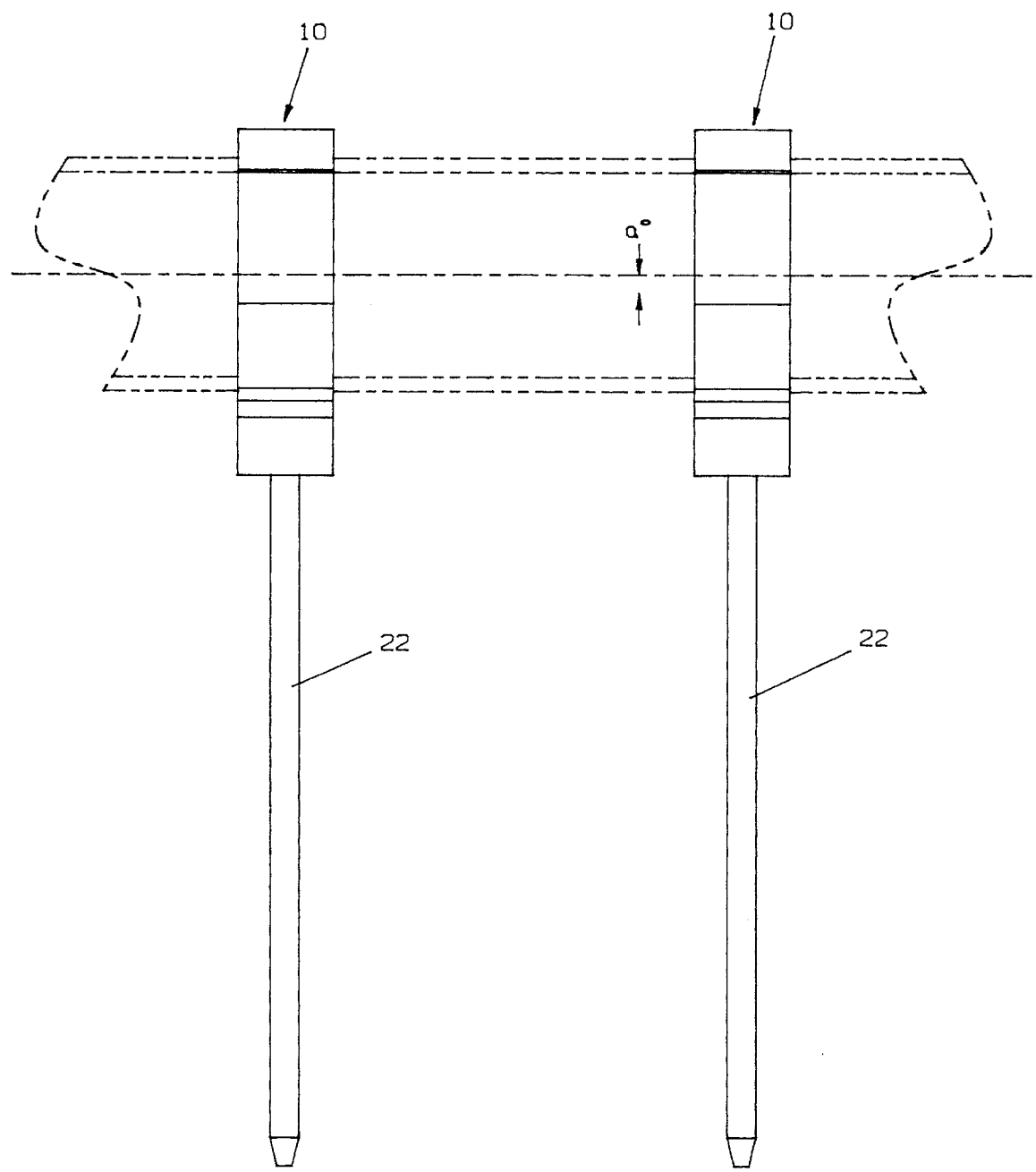
FIG. 9 is a side elevational view showing a sewer pipe-length installed at a proper gradient using a plurality of the two-piece bracket-mounts for carrying out the method of the invention.

Typically, each pipe-length will be supported by two bracket-mounts 10, with one bracket-mount 10 located adjacent one end of the pipe-length, as seen in FIG. 9. When another pipe is laid and connected to a previously-laid pipe by coupling an end thereof to an end of the previously-laid pipe by means of a coupler and cement, it is not uncommon that the correct angle "a" of the gradient achieved in the previously laid pipe be disturbed. According to the present invention, correcting this disturbance is easily and quickly achieved by hammering in the adjacent bracket-mount associated with the end of the previously-laid pipe, so that its stake is again driven into the ground the proper amount, as above-described. It is, also, possible to use a board instead of the string for establishing the reference-gradient.

According to the present invention, it is possible to entirely eliminate the shading procedure required by conventional methods, if building codes allow for such elimination of shading. Thus, in the present invention, after all of the pipes have been laid with proper gradient, all that is really necessary would be back-filling the ditch with dirt by means of a backhoe. Thus, the present invention technically allows for the complete elimination of shading, although present building codes may still perfunctorily require the shading be performed even when new construction employs the method of the invention. Moreover, inspection of the line is made easier for the inspector, since he is able to see all of the fittings. If there is a leak while the line is under test, one can see the water dripping from the fitting joint. In addition, use of the brackets 10 of the invention will correct a bow in a pipe. ABS plastic pipes tend to bow because of the heat from the sun, due to the fact that the plastic expands on one side, and is cooler on the side out of the direct sunlight. This bowing is corrected by the method of the invention.

While the above description has been directed to new construction of sewer lines, it is equally applicable to the repair of existing sewer lines, and is also applicable to the laying of other piping systems besides sewer pipes, where a gradient is required. In addition, even on those piping systems that do not require a gradient, the bracket-mounts or brackets 10 of the invention offer an easier and faster manner of laying pipes, and will still also correct defectively-shaped pipes, as above described.

While a specific embodiment of the invention has been shown and described, it is to be understood that numerous changes and modifications may be made therein without departing from the scope, spirit and intent of the invention as set forth in the appended claims.

What I claim is:

1. A method of laying a pipe in the ground, in which there is used a mounting device having a lower portion and an upper portion separately connectable to the said lower portion, the pipe having a length defined along its longitudinal axis, comprising:

(a) inserting a spike first through the lower portion of the mounting device and then driving the spike into the ground where a pipe is to be laid;

(b) snapping a portion of a pipe to be laid into the lower portion;

(c) thereafter, clamping the upper portion of the mounting device to the lower portion, to thereby circumferentially clamp the portion of the pipe by the mounting device;

said step (c) comprising sliding said upper section downwardly against said lower section in a direction transverse to said longitudinal axis of the pipe being laid in order for cooperating clamping means on the lower and upper sections to be clamped together;

wherein said method is for laying sewer pipes having proper gradient, and wherein prior to step said (a) said method comprises digging a ditch, in the bottom ground of which sewer pipes are to be laid; said step (a) comprising driving the spike into the ground an amount that achieves the proper gradient.

2. The method according to claim 1, wherein said step (a) comprises performing one of: driving the spike further into the bottom ground of the ditch, and pulling up the spike, in order to achieve the proper gradient.

3. The method according to claim 1, further comprising repeating said steps (a) through (c) a plurality of times for a different portion of the pipe and for portions of different pipes, with each portion of a pipe using a separate mounting device.

4. The method according to claim 2, further comprising repeating said steps (a) through (c) a plurality of times for a different portion of the pipe and for portions of different pipes, with each portion of a pipe using a separate mounting device.

5. The method according to claim 3, further comprising before said step (a) establishing a reference gradient for use when installing each lower semicircular half-section with spike; said step (a) comprising driving in each spike until the top of each spike is approximately even with the reference gradient.

6. The method according to claim 3, further comprising performing the process of shading after all of said steps (c) have been performed in order to partially fill up the ditch with dirt to a height where approximately half of the pipes are covered, whereby inspection for proper gradient may be carried out.

7. The method according to claim 1, wherein said step (c) comprises snap-fitting the upper portion to the lower portion, whereby the upper portion is removable from the lower portion.

8. The method according to claim 1, further comprising repeating said steps (a) and (b) a plurality of times for a plurality of pipe sections; said step (c) for each pipe section being performed after all of said steps (a) and (b) have been carried out.

9. A mounting clamping device for use in laying pipes, such as sewer pipes, in the bottom-ground of a ditch, comprising:

a lower portion defining an interior surface against which a portion of a pipe to be laid rests, and first, cooperating retaining means for mounting an upper portion to said lower portion;

an upper portion securable to said lower portion, said upper portion also defining an interior surface in which is received a portion of a pipe to be laid, and having second, cooperating retaining means for mutual engagement with said first, cooperating retaining means, whereby said cooperating means removably yet firmly mount said upper portion to said lower portion after a portion of a pipe to be laid has been supported on said interior surface of said lower portion;

said lower portion having a through-opening in a bottom section thereof; and stake means for passing through said through-opening, said stake means being capable of being driven into the bottom-ground of the ditch for securing said lower portion in said ditch and elevated a desired height above the bottom-ground of the ditch;

said first, cooperating means comprising latch means, and said second, cooperating means comprises latching means, said latching means comprising at least one prong and cutout, and said latch means comprises camming surface means and a latch-surface, said at least one prong having a canted surface against which said camming surface means acts to force said at least one prong means laterally outwardly as said upper section is slid downwardly on said lower section, said cutout receiving said latch means therein after said at least one prong has cleared said latch-surface, whereupon said latch-surface and said at least one prong means prevent said upper and lower sections from separating.

10. The mounting device for use in laying pipes according to claim 9, wherein each said interior surface of said lower and upper portions is substantially semicircular in shape in order to match the circular shape of a pipe being laid.

11. The mounting device for use in laying pipes according to claim 10, wherein each of said upper and lower portions is made of plastic.

12. The mounting device for use in laying pipes according to claim 10, further comprising a pipe received in said lower and upper portions, said pipe having an outer diameter; the interior diameter of each of said lower and upper portions being approximately equal to said outer diameter of said pipe in order for said pipe to be snapped into place in said lower and upper portions.

13. The mounting device for use in laying pipes according to claim 9, wherein said stake means comprises an elongated stake having an enlarged head for abutment against a surface of said bottom section of said lower portion, and a pointed tip end that is driven into said bottom-ground.

14. A method of laying sewer pipes in the bottom of a ditch, in which there is used a plurality of mounting devices each having a lower portion, and an upper portion separately connectable to the said lower portion, each pipe having a length defined along its longitudinal axis, comprising:

(a) inserting spikes first through the lower portions of the mounting devices, and then driving each spike into the ground at the bottom of the ditch where the sewer pipes are to be laid;

(b) snapping a portion of each pipe to be laid into one lower portion;

(c) clamping each upper portion of each mounting device to a respective lower portion, to thereby circumferentially clamp and support the pipes by the mounting device above the bottom of the ditch;

said step (c) comprising sliding each upper section downwardly against a respective lower section in a direction transverse to said longitudinal axis of the pipe being laid in order for cooperating clamping means on the lower and upper sections to be clamped together;

(d) said step (a) comprising driving in each spike an amount that achieves a specific gradient for the pipes being laid.

15. The method according to claim 14, wherein said step (d) comprises performing one of: driving the respective spike further into the bottom ground of the ditch, and pulling up the respective spike, in order to achieve the proper gradient.

16. The method according to claim 14, wherein said step (c) for all of the mounting devices is performed after said steps (a) and (b) have been carried out for all of the mounting devices.

17. The method according to claim 14, further comprising before said step (a), establishing a reference gradient-line for use when installing the lower portions with spikes; said step (a) comprising driving in each spike until the top of each spike is approximately even with the reference gradient-line.

18. The method according to claim 17, wherein said step of establishing a reference gradient-line for use when installing the lower portions with spikes comprises driving in a first vertical pole at the beginning of the pipeline, and driving in a second vertical pole at the end of the pipeline near the main sewer line, and affixing a line between the first and second poles; said step of affixing comprising sloping the line in order that the line assume the necessary gradient for the pipes.

* * * * *